C. B. DAVIS.

Fertilizer.

No. 24,542.

Patented June 28, 1859.

UNITED STATES PATENT OFFICE.

C. B. DAVIS, OF LAWRENCEBURG, TENNESSEE.

IMPROVEMENT IN MACHINES FOR SOWING FERTILIZERS IN DRILLS.

Specification forming part of Letters Patent No. 24,542, dated June 28, 1859.

*To all whom it may concern:*

Be it known that I, CALEB B. DAVIS, of the town of Lawrenceburg, in the county of Lawrence and State of Tennessee, have invented a new and useful Machine for Manuring Land, which I have named the "Land-Fertilizer;" and I do hereby declare that the following is a full, clear, and exact description of the construction and operation of the same, reference being had to the accompanying drawings, in which—

Figure 1:
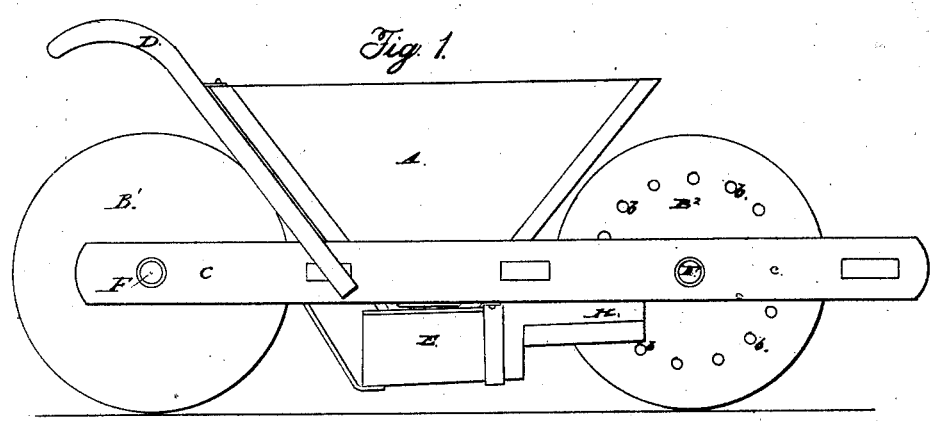
Figure 2:
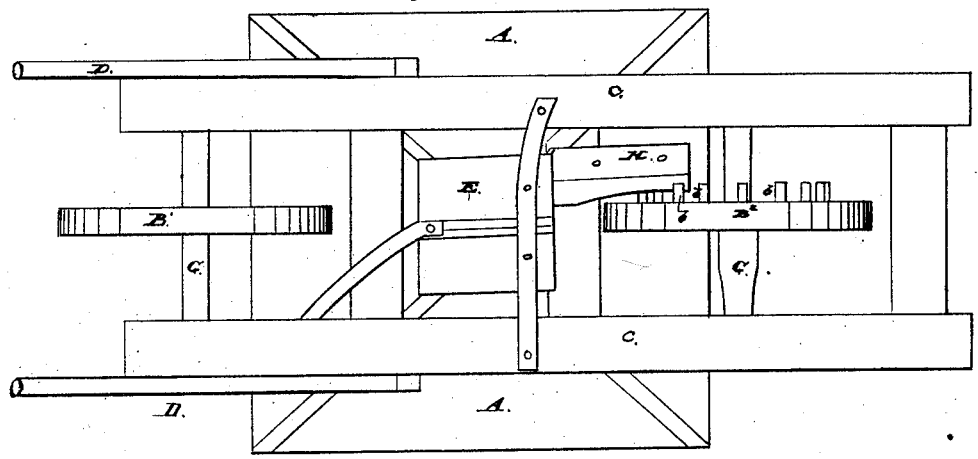

Figure 1 represents a side elevation; Fig. 2, a bottom view.

Letter A represents the hopper. B' B² are wheels of machine. C C are sides of frame. D represents handles. E is the shoe; H, the handle of shoe, which is moved by pins $b\ b$ in wheel B², and gives motion to shoe E. F are the slots in which work the bearings of axle-trees G G of wheels B' and B². The wheels B' and B² are fastened on axle-tree in the middle of frame, as seen in Fig. 2.

The design of said machine is to put lime or any other kind of manure into the ground in the following manner, to wit: A furrow being opened by a horse and plow, the said machine is placed in the furrow thus opened, which is drawn by a horse, also, which follows the plow in the opened furrow, and the lime or manure is poured out of the shoe into the furrow by means of the motion given to the shoe by the pins and wheel B², and after being poured out into the furrow the same is covered up in the ground by the said plow, and thus the process is continued. By means of said machine two men and two horses can do the work, in manuring land, of from six to ten hands per day.

What I claim as my invention, and desire to secure by Letters Patent, is—

The arrangement of hopper A, wheels B' B², frame C C, handles D D, shoe E, handle of shoe, H, pins in wheel, $b\ b$, and axle-trees G G, as described, for the purpose set forth.

CALEB B. DAVIS.

Witnesses:
D. P. PORTER,
J. M. DAVIS.